(12) United States Patent
Toki et al.

(10) Patent No.: US 7,446,465 B2
(45) Date of Patent: Nov. 4, 2008

(54) MULTI COLOR LUMINOUS FLUORESCENT DISPLAY DEVICE

(75) Inventors: Hitoshi Toki, Chiba (JP); Takuya Hamada, Chiba (JP); Tomohiro Yamada, Chiba (JP); Masahiro Kato, Chiba (JP)

(73) Assignee: Futaba Corporation, Mobara, Chiba (JP)

( * ) Notice: Subject to any disclaimer, the term of this patent is extended or adjusted under 35 U.S.C. 154(b) by 558 days.

(21) Appl. No.: 11/143,677

(22) Filed: Jun. 3, 2005

(65) Prior Publication Data

US 2005/0269938 A1    Dec. 8, 2005

(30) Foreign Application Priority Data

Jun. 3, 2004   (JP) ............................. 2004-165385
May 31, 2005  (JP) ............................. 2005-160012

(51) Int. Cl.
*H01J 1/62* (2006.01)

(52) U.S. Cl. ..................................... 313/495; 313/496

(58) Field of Classification Search ................. 313/495, 313/496; 252/301.4 R
See application file for complete search history.

(56) References Cited

U.S. PATENT DOCUMENTS 4,218,636 A * 8/1980 Miyazawa ................ 315/169.1

FOREIGN PATENT DOCUMENTS

| EP | 1550885 | 7/2005 |
|---|---|---|
| JP | 54-107483 | 8/1979 |
| WO | 98/22849 | 5/1998 |

* cited by examiner

*Primary Examiner*—Vip Patel
(74) *Attorney, Agent, or Firm*—Bacon & Thomas PLLC

(57) ABSTRACT

A multi-color luminous fluorescent display device includes therein a vacuum-sealed vessel having a glass substrate, an anode disposed on the glass substrate, a cathode installed in the vacuum-sealed vessel, a first phosphorescent layer containing a phosphor emitting yellow to red light, and a second phosphorescent layer containing a phosphor emitting blue to green light. The first phosphorescent layer contains a $Ln_2O_2S$:Eu phosphor (Ln is at least one selected from a group consisting of La, Gd, Lu and Y) which emits yellow to red light, and the second phosphorescent layer contains at least one phosphor selected from ZnO:Zn phosphor, $ZnGa_2O_4$ phosphor and $ZnGa_2O_4$:Mn phosphor which emit blue to green light.

12 Claims, 10 Drawing Sheets

1

MULTI COLOR LUMINOUS FLUORESCENT DISPLAY DEVICE

FIELD OF THE INVENTION

The present invention relates to a multi-color luminous fluorescent display device including a phosphorescent layer containing a yellow to red light emitting phosphor and a phosphorescent layer containing a blue to green light emitting phosphor, wherein light is emitted in response to electrons emitted from an electron-emitting source provided inside a vacuum-sealed vessel.

BACKGROUND OF THE INVENTION

In a fluorescent display device, in order to obtain a variety of luminous colors, a phosphor emitting yellow to red light among various phosphors is important in increasing the variation of the fluorescent display device.

A ZnCdS:Ag phosphor has been used as a yellow to red light emitting phosphor. However, the present environmental restriction requires a reduction of Cd level, which is an environmental load material and a component of the phosphor. Thus, there are strong and concerted efforts in developing Cd-free phosphors having a high reliability.

There has been known a technique for using, as one of the Cd-free phosphors, an $Ln_2O_2S$:Eu phosphor (Ln is at least one selected from a group consisting of La, Gd, Lu and Y) phosphor (hereinafter, referred to as "$Ln_2O_2S$:Eu phosphor") in the fluorescent display device.

For example, Japanese Patent Laid-open Publication No. H10-12165 discloses a technique wherein the amount of oxide on the surface of $Ln_2O_2S$:Eu phosphor is reduced below a specific value appropriately for the use of $Ln_2O_2S$:Eu phosphor, and the fluorescent display device is manufactured under a non-oxidative atmosphere by using an autolysis binder. As a result, the oxidation on the surface of the $Ln_2O_2S$:Eu phosphor is suppressed, thereby improving the initial brightness and reliability of the fluorescent display device.

Further, e.g., Japanese Patent Laid-open Publication No. H7-48570 discloses therein a technique for improving the reliability of a fluorescent display device using an $Ln_2O_2S$:Eu phosphor by forming a transparent protective film selected from $Al_2O_3$, $SiO_3$, $TiO_2$ and $CeO_3$ on the surface of $Ln_2O_2S$:Eu phosphor.

In addition, e.g., Japanese Patent Laid-open Publication No. 2003-147354 discloses therein a technique for improving the reliability of a fluorescent display device using an $Ln_2O_2S$:Eu phosphor by adding a metal selected from Mg, Sr, Ba, Be and Ca onto the surface of $Ln_2O_2S$:Eu phosphor to reform its surface.

The $Ln_2O_2S$:Eu phosphor is a Cd-free phosphor capable of being used as a phosphorescent layer composed of a phosphor emitting a yellow to red light in response to electrons emitted from an electron-emitting source provided inside a vacuum-sealed vessel while withstanding actuating conditions of the multi-color fluorescent display device.

However, in the multi-color fluorescent display device wherein the $Ln_2O_2S$:Eu phosphor is used together with a phosphorescent layer containing at least one low-resistant oxide phosphor of a ZnO:Zn phosphor, a $ZnGa_2O_4$ phosphor and a $ZnGa_2O_4$:Mn phosphor, the brightness of the phosphorescent layer composed of the $Ln_2O_2S$:Eu phosphor deteriorates in a short time period.

SUMMARY OF THE INVENTION

It is, therefore, an object of the present invention to provide a highly reliable multi-color luminous fluorescent display device using $Ln_2O_2S$:Eu phosphor as a yellow to red light emitting phosphor wherein the brightness of the $Ln_2O_2S$:Eu phosphor is not deteriorated even when it is used with at least one low-resistant oxide phosphor selected from a ZnO:Zn phosphor, a $ZnGa_2O_4$ phosphor and a $ZnGa_2O_4$:Mn phosphor which emit blue to green light. The multi-color luminous fluorescent display device includes as main components a phosphorescent layer containing a yellow to red light emitting phosphor, and a phosphorescent layer containing a blue to green light emitting phosphor, wherein light is emitted in response to electrons emitted from an electron-emitting source provided inside a vacuum-sealed vessel.

In accordance with the present invention, there is provided a multi-color luminous fluorescent display device including therein a vacuum-sealed vessel having a glass substrate, an anode disposed on the glass substrate, a cathode installed in the vacuum-sealed vessel, a first phosphorescent layer containing a phosphor emitting yellow to red light, and a second phosphorescent layer containing a phosphor emitting blue to green light, wherein the first phosphorescent layer contains a $Ln_2O_2S$:Eu phosphor (Ln is at least one selected from a group consisting of La, Gd, Lu and Y) which emits yellow to red light; and the second phosphorescent layer contains at least one phosphor selected from ZnO:Zn phosphor, $ZnGa_2O_4$ phosphor and $ZnGa_2O_4$:Mn phosphor which emit blue to green light.

Preferably, the phosphor emitting yellow to red light is a $Lu_2O_2S$:Eu phosphor, a $La_2O_2S$:Eu phosphor or a $Gd_2O_2S$:Eu phosphor, and an area of the second phosphorescent layer containing at least one phosphor selected from ZnO:Zn phosphor, $ZnGa_2O_4$ phosphor and $ZnGa_2O_4$:Mn phosphor is 95% or less of an area of the total phosphorescent layers in the fluorescent display device.

Preferably, the phosphor emitting yellow to red light is formed of a $(Lu, La, Gd, Y)_2O_2S$:Eu phosphor, a $(Lu, La, Gd)_2O_2S$:Eu phosphor or a $(Lu, La)_2O_2S$:Eu phosphor.

Preferably, an area of the second phosphorescent layer containing at least one phosphor selected from ZnO:Zn phosphor, $ZnGa_2O_4$ phosphor and $ZnGa_2O_4$:Mn phosphor is 10% or greater of an area of the total phosphorescent layers in the fluorescent display device.

With such configurations, there can be provided a highly reliable multi-color luminous fluorescent display device including $Ln_2O_2S$:Eu phosphor without an environment load material Cd as a yellow to red light emitting phosphor; and as another light emitting unit a phosphorescent layer containing at least one low-resistant oxide phosphor selected from a ZnO:Zn phosphor, a $ZnGa_2O_4$ phosphor and a $ZnGa_2O_4$:Mn phosphor.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENT

Figure 1:
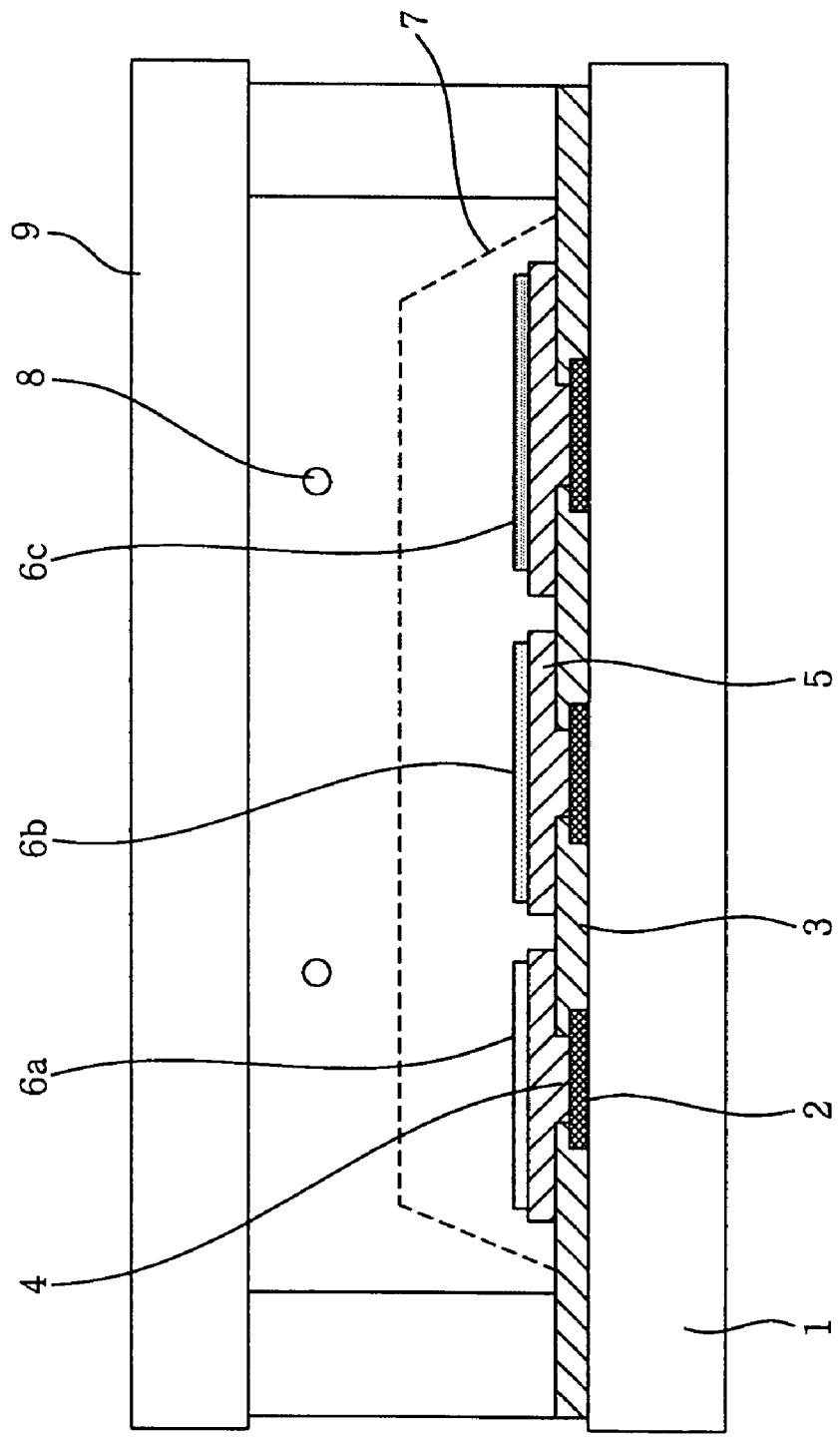
FIG. 1 shows a multi-color luminous fluorescent display device.

As illustrated in FIG. 1, a multi-color luminous fluorescent display device in accordance with the present invention includes a vacuum-sealed vessel formed by a glass substrate 1 and a box-shaped vessel 9; a cathode 8 which is an electron-emitting source installed in the vacuum-sealed vessel; a phosphorescent layer 6a using $Ln_2O_2S$:Eu phosphor emitting a yellow to red light; and a phosphorescent layer using at least one low-resistant oxide phosphor selected from ZnO:Zn phosphor, $ZnGa_2O_4$ phosphor and $ZnGa_2O_4$:Mn phosphor.

For the fluorescent display device including the phosphorescent layer containing the $Ln_2O_2S$:Eu phosphor and the phosphorescent layer containing the ZnO:Zn phosphor and other oxide phosphor, the inventors examined a cause of deterioration in brightness of the phosphorescent layer containing the $Ln_2O_2S$:Eu phosphor.

As a result, it has been confirmed that the greater the occupancy ratio of the phosphorescent layer containing the ZnO:Zn phosphor relative to the phosphorescent layer containing the $Ln_2O_2S$:Eu phosphor in the fluorescent display device, the more severe the deterioration of the life span of $Ln_2O_2S$:Eu phosphor. The reasons are as follows.

First, for the fluorescent display device including the phosphorescent layer containing the $Ln_2O_2S$:Eu phosphor, and the phosphorescent layer containing the ZnO:Zn phosphor and/or other oxide phosphor, an ESCA analysis was performed on the surface of the $Ln_2O_2S$:Eu phosphor whose brightness was deteriorated after the fluorescent display device had been actuated by irradiating electron beams for an extended period of time to the phosphorescent layers.

As a result, it was confirmed that the amount of sulfate group on the surface of the $Ln_2O_2S$:Eu phosphor in the fluorescent display device after it had been actuated by irradiating electron beams for an extended period of time is increased compared with the initial amount of sulfate group on the surface of the $Ln_2O_2S$:Eu phosphor. (Here, the sulfate group means a unstable sulfur composition resulted from that a part of S (sulfur) constituting the crystallization of the $Ln_2O_2S$:Eu phosphor combines with a trace amount of moisture.)

Then, the inventors considered as a source of the sulfate group a trace amount of moisture in the fluorescent display device and confirmed that in the following sequence. First, after making a fluorescent display device including a phosphorescent layer containing the ZnO:Zn phosphor and a mass analyzer, a partial pressure of a trace amount of gas when a voltage is applied to the cathode. The results are shown in FIG. 2.

Figure 2:
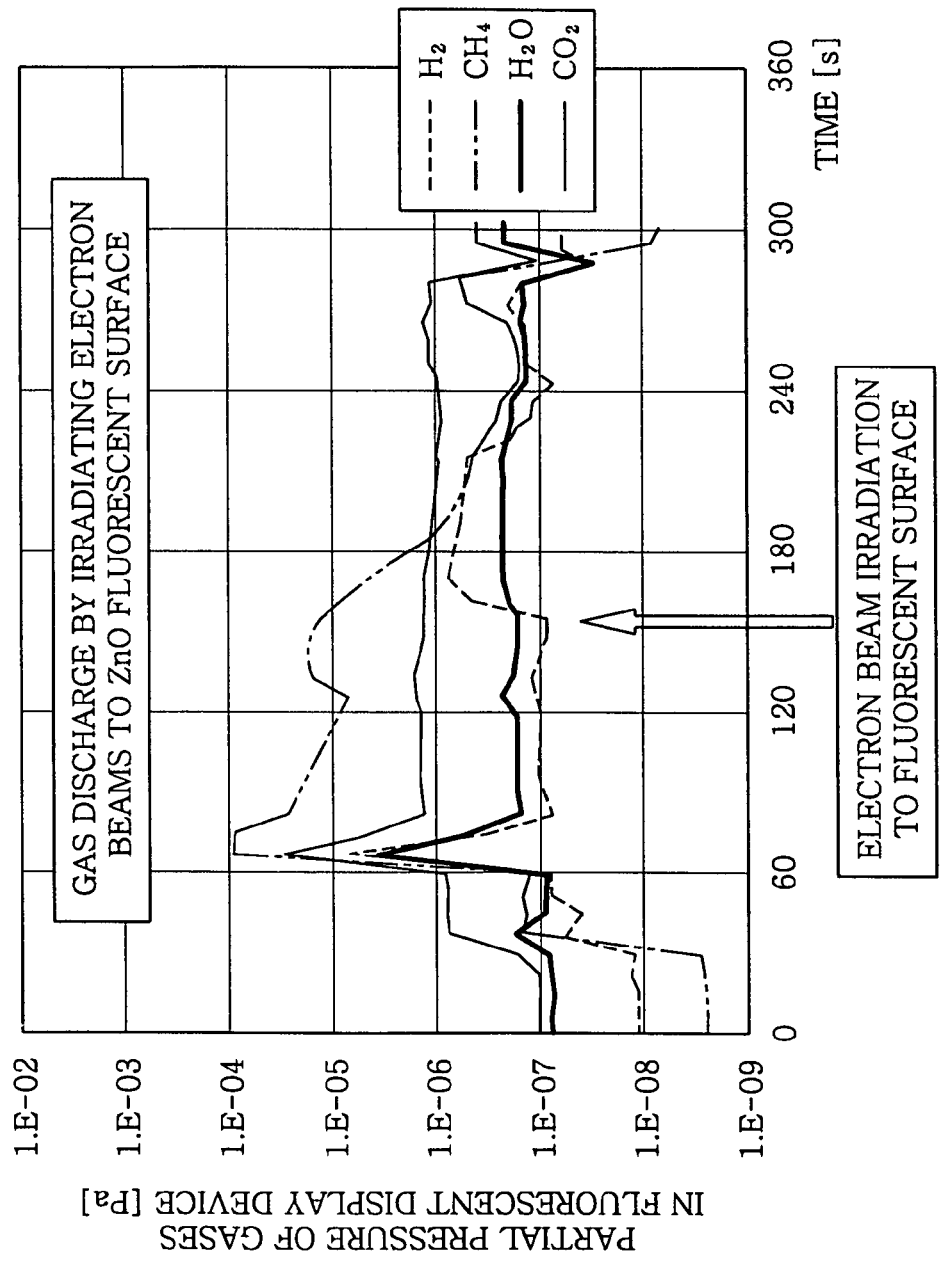
FIG. 2 is a graph analyzing a discharge phenomenon of gases from an oxide phosphor such as ZnO:Zn phosphor.

FIG. 2 is a graph analyzing a discharge phenomenon of gases from an oxide phosphor such as ZnO:Zn phosphor. From FIG. 2, in a sealed fluorescent display device, it was confirmed that $H_2O$ is discharged, $H_2$ is increased by $H_2O$ reacting with a trace amount of $CO_2$ present in the fluorescent display device and $CH_4$ is increased by $H_2O$ reacting with $CO_2$.

Based on the above, it can be considered that the fluorescent display device including the ZnO:Zn phosphor as a phosphorescent layer discharges a trace amount of moisture by being excited by electron beams.

Here, as a result of examining a cause of deterioration in brightness of the $Ln_2O_2S$:Eu phosphor, the ZnO:Zn phosphor and/or other oxide phosphor are generally hydrophilic and have a nature to readily occlude moisture. Further, as a result of analyzing gases upon irradiation of electron beams from filaments in the fluorescent display device, it is considered that the moisture obtains energy by the irradiation of electron beams to be separated from the phosphor.

In other words, it was reasoned that a trace amount of moisture is occluded/accumulated in ZnO:Zn phosphor which is an oxide phosphor used in a fluorescent display device, then, the moisture is discharged while the fluorescent display device is being idle and/or activated, which is considered as a cause of the formation of sulfate group.

Further, as for another cause of the deterioration in the brightness of $Ln_2O_2S$:Eu phosphor, it is reasoned that a heat treatment during the fluorescent display device manufacturing process causes surface oxidation, which leads to surface deterioration, then, the deterioration becomes more severe due to an interaction between electron beams and $H_2O$, which is a component of residual gas in the fluorescent display device.

$ZnGa_2O_4$ phosphor and $ZnGa_2O_4$:Mn phosphor which are an oxide phosphor other than ZnO:Zn phosphor are also the same as the ZnO:Zn phosphor in the above point of view.

Furthermore, a vacuum state of a fluorescent display device is obtained at high temperature ranging from 300° C. to 400° C. Then, the fluorescent display device employs as a getter material a substance having the function of adsorbing residual gas molecules to exclude it from a gaseous phase, e.g., a refractory metal such as Ti, Mo, Ba, Zr etc., thereby maintaining a high vacuum state of $1\times10^{-3}$ Pa or less in a closed space. However, in the oxide phosphor, since the moisture cannot be removed at the heat treatment in the manufacturing process of the fluorescent display device, it is considered that the brightness deterioration is caused by the influence of (an oxidative gas such as) the moisture separated by the energy due to the electron beam excitation.

That is, all moisture in the vacuum cannot be removed and a trace amount of moisture remains inside the vacuum vessel of the fluorescent display device. Thus, when the fluorescent display device is activated, by the effect of electrons from a filament, the trace amount of moisture is adsorbed on the surface of $Ln_2O_2S$:Eu phosphor by reacting with the phosphor's sulfur. Accordingly, oxidation is promoted, thereby resulting in the formation of a sulfate group.

It was confirmed that, as the phosphorescent layer containing ZnO:Zn phosphor occupies more area, the amount of moisture discharged increase. Therefore, the surface $Ln_2O_2S$:Eu phosphor is deteriorated and the brightness deterioration of $Ln_2O_2S$:Eu phosphor becomes more severe.

Further, in order to confirm characteristic of each of $Lu_2O_2S$:Eu phosphor, $Gd_2O_2S$:Eu phosphor, $La_2O_2S$:Eu phosphor and $Y_2O_2S$:Eu phosphor contain respectively Lu, Gd, La, Y of Ln (lanthanide) series, emission start voltage, which is a voltage upon an initial emission of phosphor, was examined while gradually increasing an anode voltage after the phosphor had been installed in the fluorescent display device.

The Ln (lanthanide) series elements have a common nature as a rare-earth element, but are somewhat different in a magnitude of mass and an array of electrons. It has been known that, in terms of a resistance value, the greater the mass, the stronger the common nature becomes (the smaller the resistance becomes).

Figure 3:
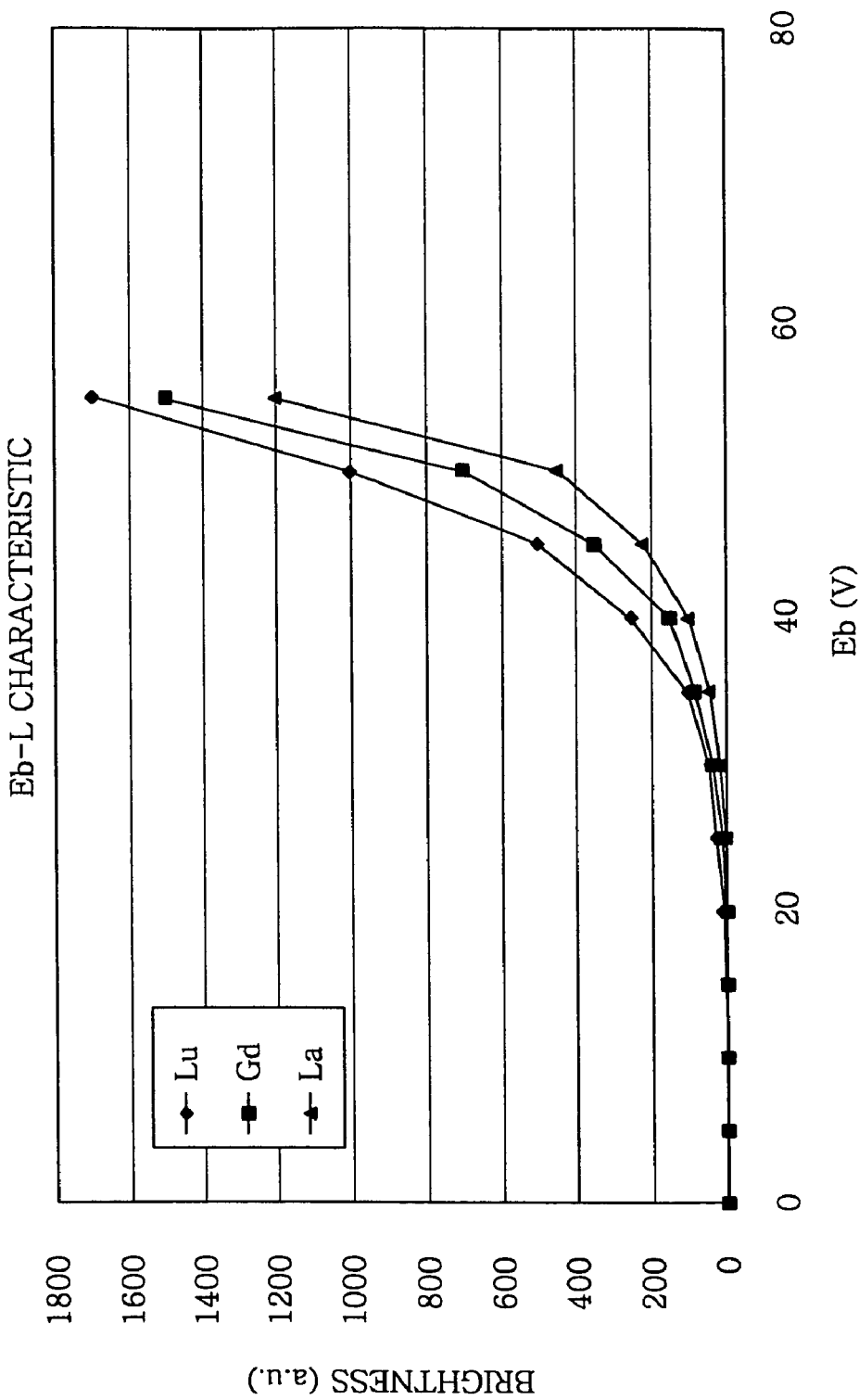
FIG. 3 is a graph showing an emission begin voltage of $Lu_2O_2S$:Eu phosphor, $Gd_2O_2S$:Eu phosphor, $La_2O_2S$:Eu phosphor and $Y_2O_2S$:Eu phosphor.

FIG. 3 is a graph showing an emission start voltage of $Lu_2O_2S$:Eu phosphor, $Gd_2O_2S$:Eu phosphor, $La_2O_2S$:Eu phosphor and $Y_2O_2S$:Eu phosphor.

From FIG. 3, since the phosphor begins to emit light at a lower voltage as the resistance becomes smaller, the fluorescent display devices respectively using $Lu_2O_2S$:Eu phosphor, $Gd_2O_2S$:Eu phosphor and $La_2O_2S$:Eu phosphor emit light at about 20 V, and $Lu_2O_2S$:Eu phosphor, $Gd_2O_2S$:Eu phosphor and $La_2O_2S$:Eu phosphor begin to emit light in that order.

Accordingly, it is understood that resistance of the basic materials are becomes small in the order of $Lu_2O_2S$:Eu phosphor, $Gd_2O_2S$:Eu phosphor and $Lu_2O_2S$:Eu phosphor.

This means that the magnitude of the basic material's resistance is in proportion with depth of electrons penetrating into the phosphor and that as the basic materials resistance is smaller, the light emitting area is more advanced to the inside of the phosphor. In other words, this means that, as the phosphor has a greater resistance, the contribution to light emission near the surface thereof becomes greater and that, in terms of life span, the greater the basic material's resistance is, the greater the surface status affects the light emission.

Accordingly, in the order of $Lu_2O_2S$:Eu phosphor, $Gd_2O_2S$:Eu phosphor and $La_2O_2S$:Eu phosphor, the percentage of the surface status affecting the light emission becomes greater.

However, in the multi-color luminescent fluorescent display device, a green light emitting ZnO:Zn phosphor and/or other oxide phosphors, which have been used conventionally, are very important, and need to be used together with $Ln_2O_2S$:Eu phosphor.

Here, in the multi-color luminous fluorescent display device using a phosphor such as $Ln_2O_2S$:Eu phosphor of which brightness is markedly deteriorated due to a trace amount of moisture in the vacuum-sealed vessel together with ZnO:Zn phosphor and/or other oxide phosphors, by adjusting the percentage of the area of a phosphorescent layer containing ZnO:Zn phosphor and/or other oxide phosphors relative to the area of the total phosphors in the fluorescent display device, the occlusion/discharge of a trace amount of moisture in the fluorescent display device is limited, and the influence of ZnO:Zn phosphor and/or other oxide phosphors on $Lu_2O_2S$:Eu phosphor, $Gd_2O_2S$:Eu phosphor and $La_2O_2S$:Eu phosphor is limited. As a result, there can be provided a multi-color fluorescent display device capable of using a phosphor of which brightness is markedly deteriorated due to a trace amount of moisture among $Ln_2O_2S$:Eu phosphor.

Accordingly, by the limitation on the area of the phosphorescent layer containing the ZnO:Zn phosphor and/or other oxide phosphors, the discharge of a trace amount of moisture by the ZnO:Zn phosphor and/or other oxide phosphors is limited.

Furthermore, there can be provided a multi-color luminous fluorescent display device capable of using a sulfide phosphor and/or other phosphors for use in the fluorescent display device as well as $Ln_2O_2S$:Eu phosphor at a region other than the region of the phosphorescent layer containing the ZnO:Zn phosphor and/or other oxide phosphors in the regions of the phosphorescent layers in the fluorescent display device.

$Ln_2O_2S$:Eu phosphor used in the present invention was prepared as follows.

(1) A Compound of $La_2O_2S$:Eu phosphor

Per a mole of $La_2O_2$, 1.2 moles of sulfur and sodium carbonate were added, then $Eu_2O_3$ was added thereto such that Eu to La ratio was 4 atm %. The mixture was charged in an alumina crucible which was then sealed with a lid. Next, the mixture was sintered for two hours at 1200° C., thereby forming $La_2O_2S$:Eu phosphor.

(2) A Compound of $Lu_2O_2S$:Eu phosphor

Per a mole of $Lu_2O_2$, 1.2 moles of sulfur and sodium carbonate were added, then $Eu_2O_3$ was added thereto such that Eu to La ratio was 4 atm %. The mixture was charged in an alumina crucible which was then sealed with a lid. Next, the mixture was sintered for two hours at 1200° C., thereby forming $Lu_2O_2S$:Eu phosphor.

(3) A Compound of a $Gd_2O_2S$:Eu phosphor

Per a mole of $Gd_2O_2$, 1.2 moles of sulfur and sodium carbonate were added, then $Eu_2O_3$ was added thereto such that Eu to La ratio was 4 atm %. The mixture was charged in an alumina crucible which was then sealed with a lid. Next, the mixture was sintered for two hours at 1200° C., thereby forming $Gd_2O_2S$:Eu phosphor.

Thereafter, multi-color luminous fluorescent display devices were prepared by varying an occupancy ratio between the light emitting unit composed of a phosphorescent layer having $Ln_2O_2S$:Eu phosphor and the light emitting unit composed of a phosphorescent layer having ZnO:Zn phosphor.

More specifically, as illustrated in FIG. 1, a thin aluminum film is formed on the top surface of a glass substrate 1 and then patterned by using a photolithography technique, thereby forming a wiring pattern 2. An insulating layer 3 mainly composed of glass having a low melting point is formed on the top surface of the wiring pattern 2, and through holes 4 communicating with a wiring conductor are formed on the insulating layer. Further, an anode conductor 5 mainly composed of graphite is formed on the top surface of the insulating layer 3 and sintered, to thereby block the through holes.

The $Ln_2O_2S$:Eu phosphor is then made into a paste by dispersing it in butyl carbitol solvent by using ethyl cellulose as a binder.

The phosphor paste is coated on the top surface of a graphite electrode, which is an anode conductor, into specific patterns by screen printing and then dried, thereby forming a phosphorescent layer 6a having $Ln_2O_2S$:Eu phosphor.

Thereafter, ZnO:Zn phosphor is made into a paste by dispersing it in butyl carbitol solvent by using ethyl cellulose as a binder. Next, the phosphor paste is coated on the graphite electrode in specific patterns by screen printing and then dried, thereby forming phosphor layers 6b and 6c having the ZnO:Zn phosphor. In this manner, the manufacture of an anode substrate is completed.

The vacuum-sealed vessel, which is formed of glass having a low melting point in an atmosphere of 400° C. to 500° C., is fabricated by installing therein the anode substrate on which the phosphorescent layer 6a having the $Ln_2O_2S$:Eu phosphor and the phosphor layers 6b and 6c having the ZnO:Zn phosphor are formed; a grid 7; and a cathode 8 and then assembling the box-shaped vessel 9 or the like.

Next, in the atmosphere of 300° C. to 400° C., the gas in the vessel is discharged, thereby fabricating a vacuum-sealed multi-color luminous fluorescent display device.

Hereinafter, there will be described specific examples for examining light emitting characteristics of a multi-color luminous fluorescent display device having a light emitting unit composed of a phosphorescent layer containing $Ln_2O_2S$:Eu phosphor emitting yellow to red light and another light emitting unit composed of a phosphorescent layer containing ZnO:Zn phosphor.

COMPARATIVE EXAMPLE

A luminous fluorescent display device exclusively using an $La_2O_2S$:Eu phosphor, a $Gd_2O_2S$:Eu phosphor or an $Lu_2O_2S$:Eu phosphor In order to examine the effect of a trace amount of moisture contained in ZnO:Zn phosphor, there were manufactured fluorescent display devices in which one of an $La_2O_2S$:Eu phosphor, a $Gd_2O_2S$:Eu phosphor and an $Lu_2O_2S$:Eu phosphor was exclusively used in the phosphor layers 6a to 6c serving as a display unit. Then, to examine the brightness deterioration thereof, the fluorescent display devices were activated for 1000 hours while an anode voltage of 60 V was applied thereto.

Figure 4:
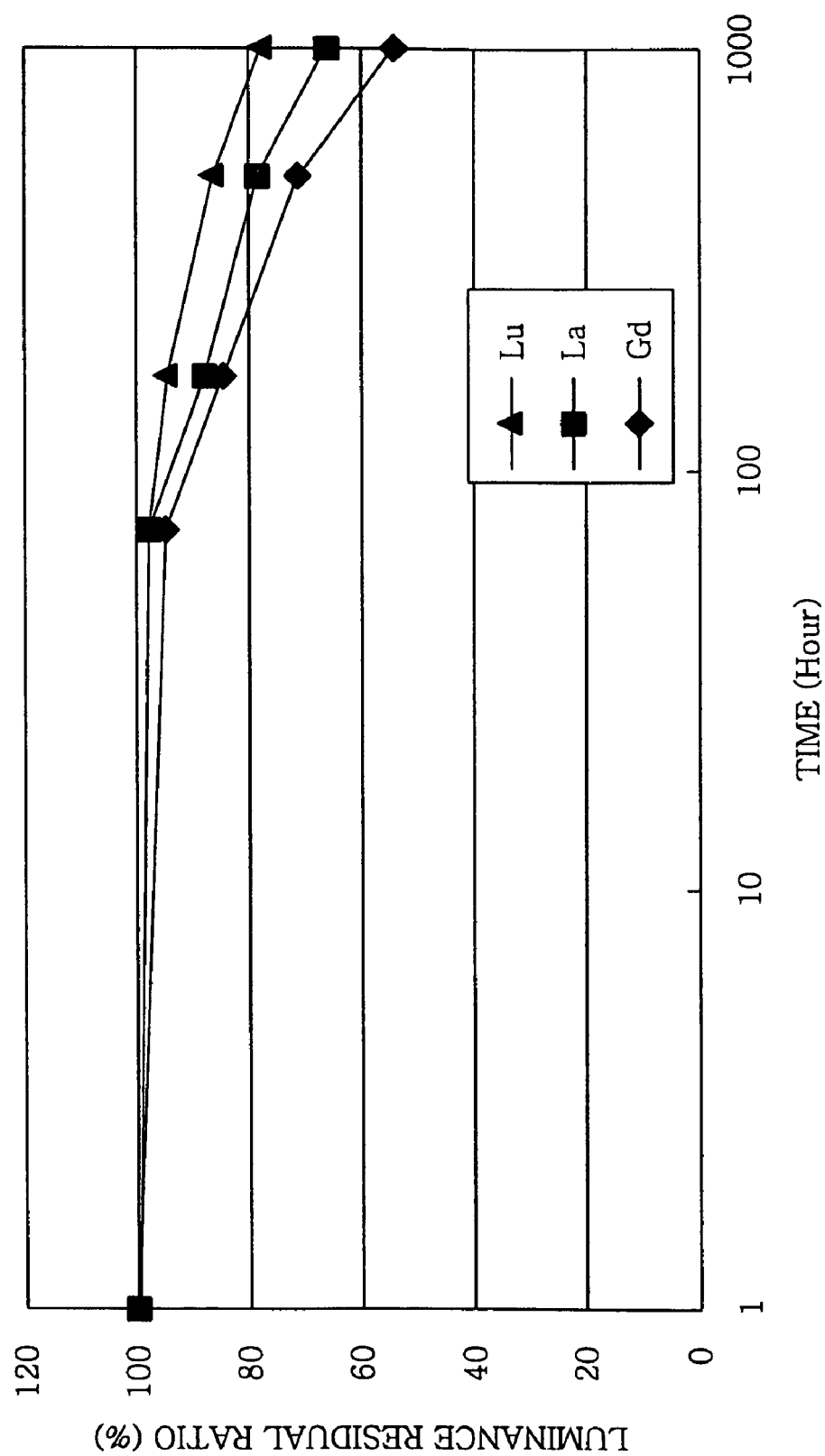
FIG. 4 is a graph illustrating the life spans of light emitting units each composed of a phosphor layer containing an $La_2O_2S$:Eu phosphor, a $Gd_2O_2S$:Eu phosphor and an $Lu_2O_2S$:Eu phosphor, respectively, in a fluorescent display device without ZnO:Zn phosphor.

FIG. 4 is a graph illustrating the life spans of the light emitting units which are respectively composed of the phosphor layers each having $La_2O_2S$:Eu phosphor, $Gd_2O_2S$:Eu phosphor and $Lu_2O_2S$:Eu phosphor in the fluorescent display device without ZnO:Zn phosphor.

According to FIG. 4, even in case the fluorescent display device uses the $Gd_2O_2S$:Eu phosphor of which brightness is markedly deteriorated, the brightness thereof, which is reached after activating it continuously for 1000 hours, stays in the range of 55% of the initial brightness. Further, the fluorescent display device using the $La_2O_2S$:Eu phosphor maintains 67% of the initial brightness, and the fluorescent display device using the $Lu_2O_2S$:Eu phosphor maintains 79% of the initial brightness, all of which can be used individually.

Example 1

A multi-color luminous fluorescent display device wherein 10% of the entire display area is occupied by a light emitting unit composed of a phosphorescent layer containing ZnO:Zn phosphor and the other display area is occupied by a light emitting unit composed of phosphor layers each containing an $La_2O_2S$:Eu phosphor, a $Gd_2O_2S$:Eu phosphor or an $Lu_2O_2S$:Eu phosphor, respectively.

In order to examine the effect of a trace amount of moisture contained in the ZnO:Zn phosphor, which is considered as a material capable of occluding a trace amount of moisture, there were manufactured fluorescent display devices wherein 10% of the entire display area is occupied by a light emitting unit composed of a phosphorescent layer containing ZnO:Zn phosphor and the other display area is occupied by another light emitting unit composed of a phosphorescent layers containing an $La_2O_2S$:Eu phosphor, a $Gd_2O_2S$:Eu phosphor or an $Lu_2O_2S$:Eu phosphor, respectively. Then, to examine the brightness deterioration thereof, the fluorescent display devices were activated continuously for 1000 hours while applying thereto an anode voltage of 60 V.

Figure 5:
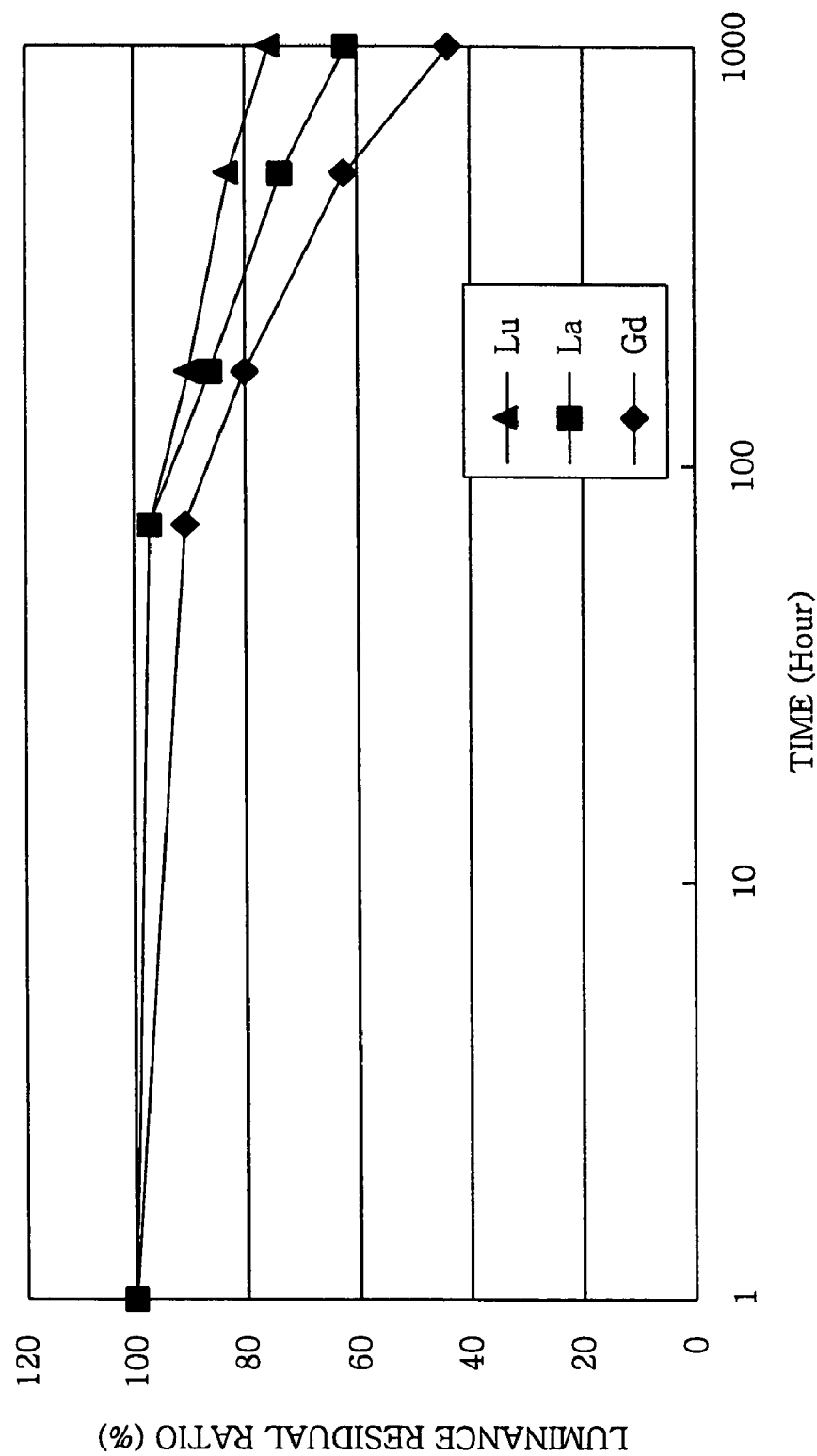
FIG. 5 is a graph illustrating the life spans of light emitting units each composed of a phosphor layer containing an $La_2O_2S$:Eu phosphor, a $Gd_2O_2S$:Eu phosphor and an $Lu_2O_2S$:Eu phosphor, respectively, in a multi-color luminous fluorescent display device, wherein the light emitting unit composed of a phosphorescent layer containing ZnO:Zn phosphor occupies 10% of the entire display area.

FIG. 5 is a graph illustrating the life spans of the light emitting units which are respectively composed of the phosphor layers having the $La_2O_2S$:Eu phosphor, the $Gd_2O_2S$:Eu phosphor and the $Lu_2O_2S$:Eu phosphor in the fluorescent display devices in which the light emitting unit composed of the phosphorescent layer having the ZnO:Zn phosphor occupies 10% of the entire display area.

According to FIG. 5, as for the fluorescent display device using the $Gd_2O_2S$:Eu phosphor of which brightness is markedly deteriorated, the brightness thereof, which was reached after activating it continuously for 1000 hours, remains in the range of 45% of the initial brightness. However, the operation time of the $Gd_2O_2S$:Eu phosphor emitting yellow to red light is generally short, so that it can be used practically.

On the other hand, the fluorescent display device using the $La_2O_2S$:Eu phosphor maintains 67% of the initial brightness, and the fluorescent display device using the $Lu_2O_2S$:Eu phosphor maintains 78% of the initial brightness, both of which are satisfactory for practical purposes.

Furthermore, in case the light emitting unit composed of the phosphorescent layer having the ZnO:Zn phosphor occupies 10% of the entire display area, there can also be provided a multi-color fluorescent using a sulfide phosphor and/or other phosphors for use in the fluorescent display device as the phosphorescent layer of the remaining 90% in the multi-color fluorescent display device.

Example 2

A multi-color luminous fluorescent display device wherein 40% of the entire display area is occupied by a light emitting unit composed of a phosphorescent layer containing ZnO:Zn phosphor and the other display area is occupied by a light emitting unit composed of phosphor layers containing an $La_2O_2S$:Eu phosphor, a $Gd_2O_2S$:Eu phosphor or an $Lu_2O_2S$:Eu phosphor, respectively.

In order to examine the effect of a trace amount of moisture contained in the ZnO:Zn phosphor, which is considered as a material capable of occluding a trace amount of moisture, there were manufactured fluorescent display devices in which 40% of the entire display area is occupied by a light emitting unit composed of a phosphorescent layer containing ZnO:Zn phosphor and the other display area is occupied by another light emitting unit composed of phosphorescent layers containing an $La_2O_2S$:Eu phosphor, a $Gd_2O_2S$:Eu phosphor or an $Lu_2O_2S$:Eu phosphor, respectively. Then, to examine the brightness deterioration thereof, the fluorescent display devices were activated continuously for 1000 hours while applying thereto an anode voltage of 60 V.

Figure 6:
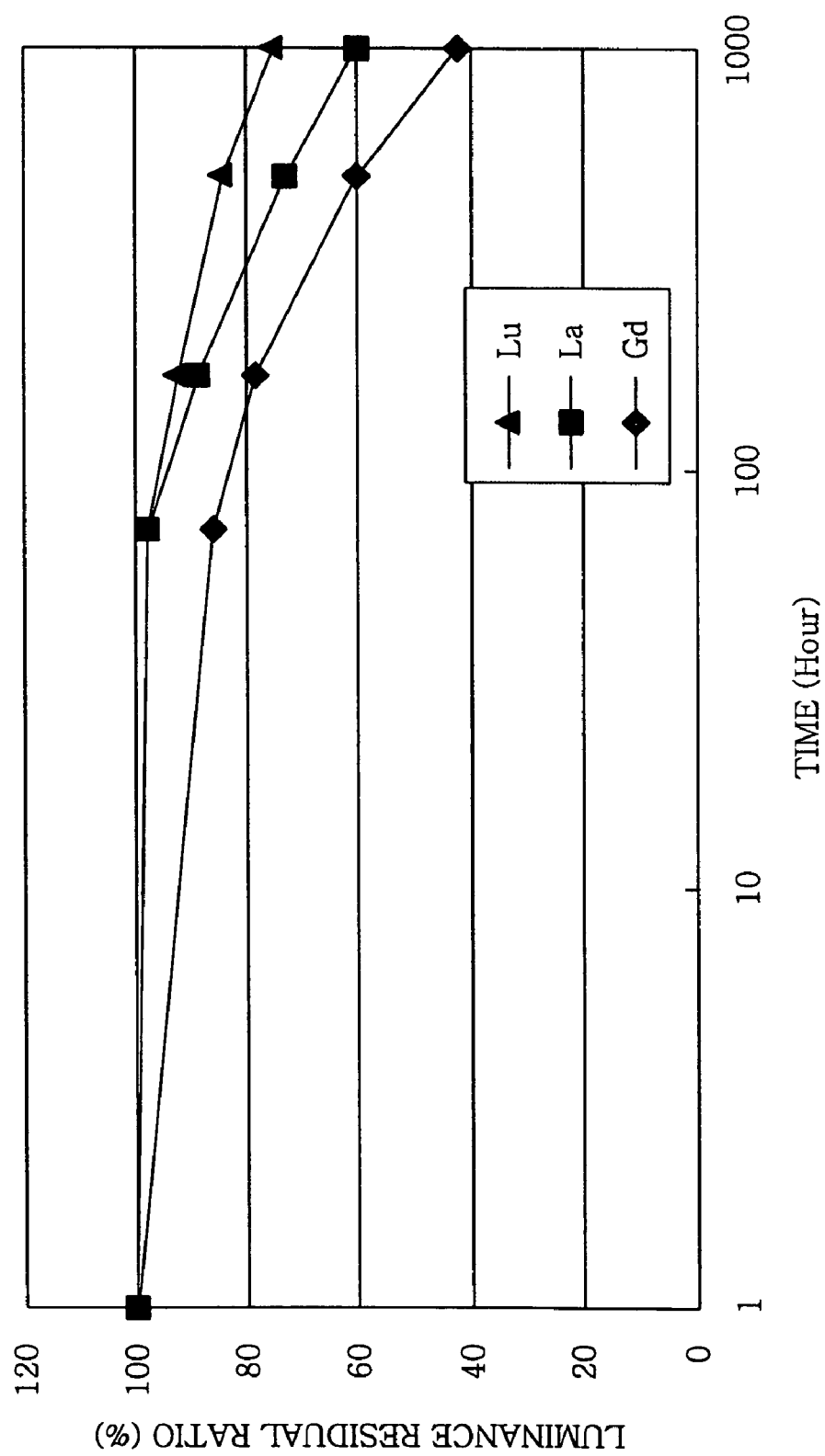
FIG. 6 is a graph illustrating the life spans of light emitting units each composed of a phosphor layer containing an $La_2O_2S$:Eu phosphor, a $Gd_2O_2S$:Eu phosphor and an $Lu_2O_2S$:Eu phosphor, respectively, in a multi-color luminous fluorescent display device, wherein the light emitting unit composed of a phosphorescent layer containing ZnO:Zn phosphor occupies 40% of the entire display area.

FIG. 6 is a graph illustrating the life spans of the light emitting units which are respectively composed of the phosphor layers having the $La_2O_2S$:Eu phosphor, the $Gd_2O_2S$:Eu phosphor and the $Lu_2O_2S$:Eu phosphor in the fluorescent display devices in which the light emitting unit composed of the phosphorescent layer having the ZnO:Zn phosphor occupies 40% of the entire display area.

According to FIG. 6, in case of the fluorescent display device using the $Gd_2O_2S$:Eu phosphor of which brightness is markedly deteriorated, the brightness thereof, which was obtained after activating it continuously for 1000 hours, remains in the range of 42% of an initial brightness. However, the operation time of the $Gd_2O_2S$:Eu phosphor emitting yellow to red light is generally short, so that it can be used practically.

On the other hand, the fluorescent display device using the $La_2O_2S$:Eu phosphor maintains 60% of the initial brightness, and the fluorescent display device using the $Lu_2O_2S$:Eu phosphor maintains 75% of the initial brightness, both of which are satisfactory for practical purposes.

Furthermore, in case the light emitting unit composed of the phosphorescent layer having the ZnO:Zn phosphor occupies 40% of the entire display area, there can also be provided a multi-color fluorescent using a sulfide phosphor and/or other phosphors for use in the fluorescent display device as the phosphorescent layer of the remaining 60% in the multi-color fluorescent display device.

Example 3

A multi-color luminous fluorescent display device wherein 80% of the entire display area is occupied by a light emitting unit composed of a phosphorescent layer containing ZnO:Zn phosphor and the other display area is occupied by a light emitting unit composed of phosphor layers containing an $La_2O_2S$:Eu phosphor, a $Gd_2O_2S$:Eu phosphor or an $Lu_2O_2S$:Eu phosphor, respectively.

In order to examine the effect of a trace amount of moisture contained in the ZnO:Zn phosphor, which is considered as a material capable of occluding a trace amount of moisture, there were manufactured fluorescent display devices in which 80% of the entire display area is occupied by a light emitting unit composed of a phosphorescent layer containing ZnO:Zn phosphor and the other display area is occupied by another light emitting unit composed of a phosphorescent layer containing an $La_2O_2S$:Eu phosphor, a $Gd_2O_2S$:Eu phosphor or an $Lu_2O_2S$:Eu phosphor, respectively. Then, to examine the brightness deterioration thereof, the fluorescent display devices were activated continuously for 1000 hours while applying thereto an anode voltage of 60 V.

Figure 7:
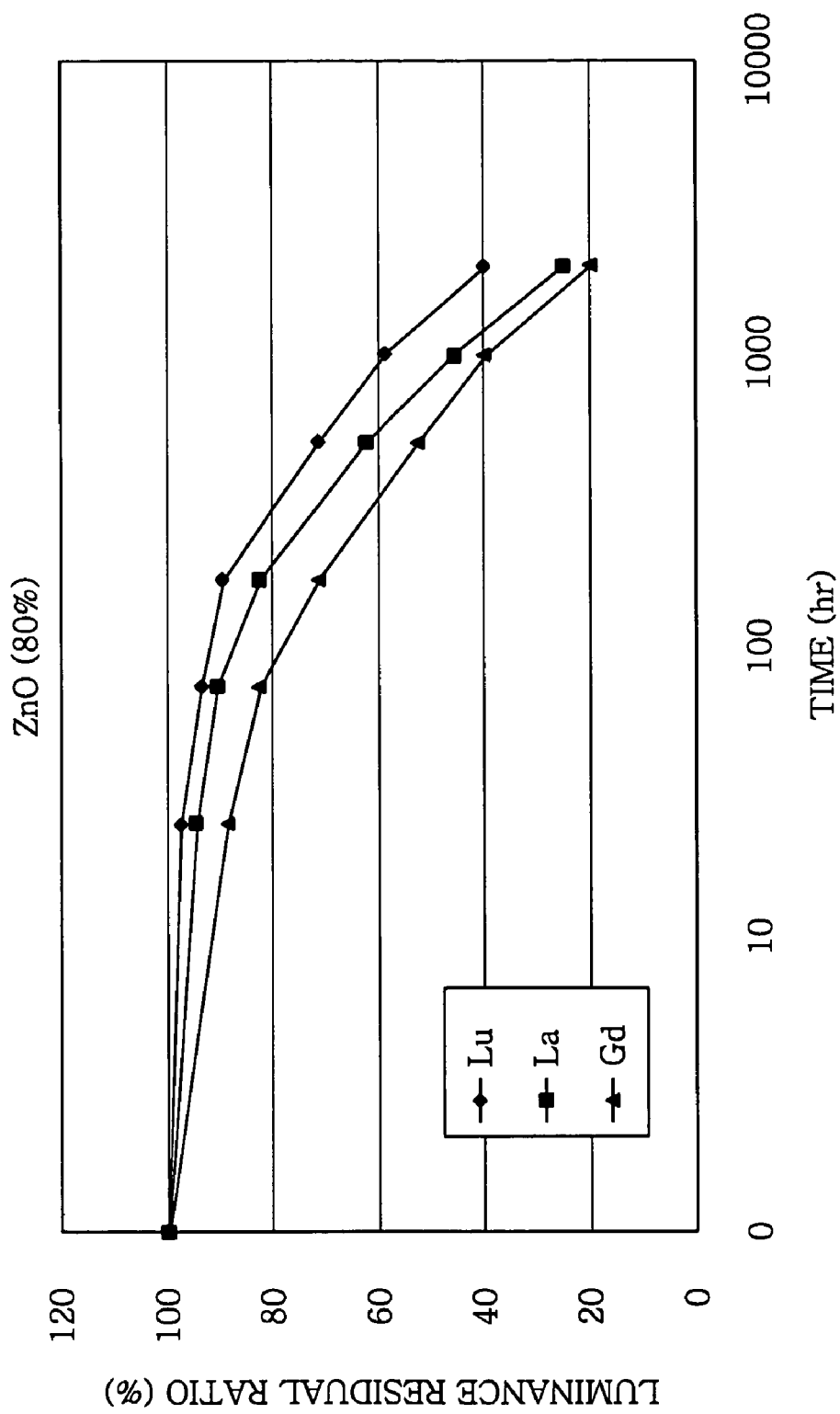
FIG. 7 is a graph illustrating the life spans of the light emitting units which are respectively composed of the phosphor layers having the $La_2O_2S$:Eu phosphor, the $Gd_2O_2S$:Eu phosphor and the $Lu_2O_2S$:Eu phosphor in the fluorescent display devices in which the light emitting unit composed of the phosphorescent layer having the ZnO:Zn phosphor occupies 80% of the entire display area.

FIG. 7 is a graph illustrating the life spans of the light emitting units which are respectively composed of the phosphor layers having the $La_2O_2S$:Eu phosphor, the $Gd_2O_2S$:Eu phosphor and the $Lu_2O_2S$:Eu phosphor in the fluorescent display devices in which the light emitting unit composed of the phosphorescent layer having the ZnO:Zn phosphor occupies 80% of the entire display area.

According to FIG. 7, in case of the fluorescent display device using the $Gd_2O_2S$:Eu phosphor of which brightness is markedly deteriorated, the brightness thereof, which was obtained after activating it continuously for 1000 hours, remains in the range of 40% of an initial brightness. However, the operation time of the $Gd_2O_2S$:Eu phosphor emitting yellow to red light is generally short, so that it can be used practically. Further, although the fluorescent display device using the $La_2O_2S$:Eu phosphor also maintains 46% of the initial brightness, the operation time of the $La_2O_2S$:Eu phosphor emitting yellow to red light is generally short, so that it can be used practically.

However, the fluorescent display device using the $Lu_2O_2S$:Eu phosphor maintains 59% of the initial brightness, both of which are satisfactory for practical purposes.

Furthermore, in case the light emitting unit composed of the phosphorescent layer having the ZnO:Zn phosphor occupies 80% of the entire display area, there can also be provided a multi-color fluorescent using a sulfide phosphor and/or other phosphors for use in the fluorescent display device as the phosphorescent layer of the remaining 20% in the multi-color fluorescent display device.

Example 4

A multi-color luminous fluorescent display device wherein 90% of the entire display area is occupied by a light emitting unit composed of a phosphorescent layer containing ZnO:Zn phosphor and the other display area is occupied by a light emitting unit composed of phosphor layers containing an $La_2O_2S$:Eu phosphor, a $Gd_2O_2S$:Eu phosphor or an $Lu_2O_2S$:Eu phosphor, respectively.

In order to examine the effect of a trace amount of moisture contained in the ZnO:Zn phosphor, which is considered as a material capable of occluding a trace amount of moisture, there were manufactured fluorescent display devices in which 90% of the entire display area is occupied by a light emitting unit composed of a phosphorescent layer containing ZnO:Zn phosphor and the other display area is occupied by another light emitting unit composed of a phosphorescent layer containing an $La_2O_2S$:Eu phosphor, a $Gd_2O_2S$:Eu phosphor or an $Lu_2O_2S$:Eu phosphor, respectively. Then, to examine the brightness deterioration thereof, the fluorescent display devices were activated continuously for 1000 hours while applying thereto an anode voltage of 60 V.

Figure 8:
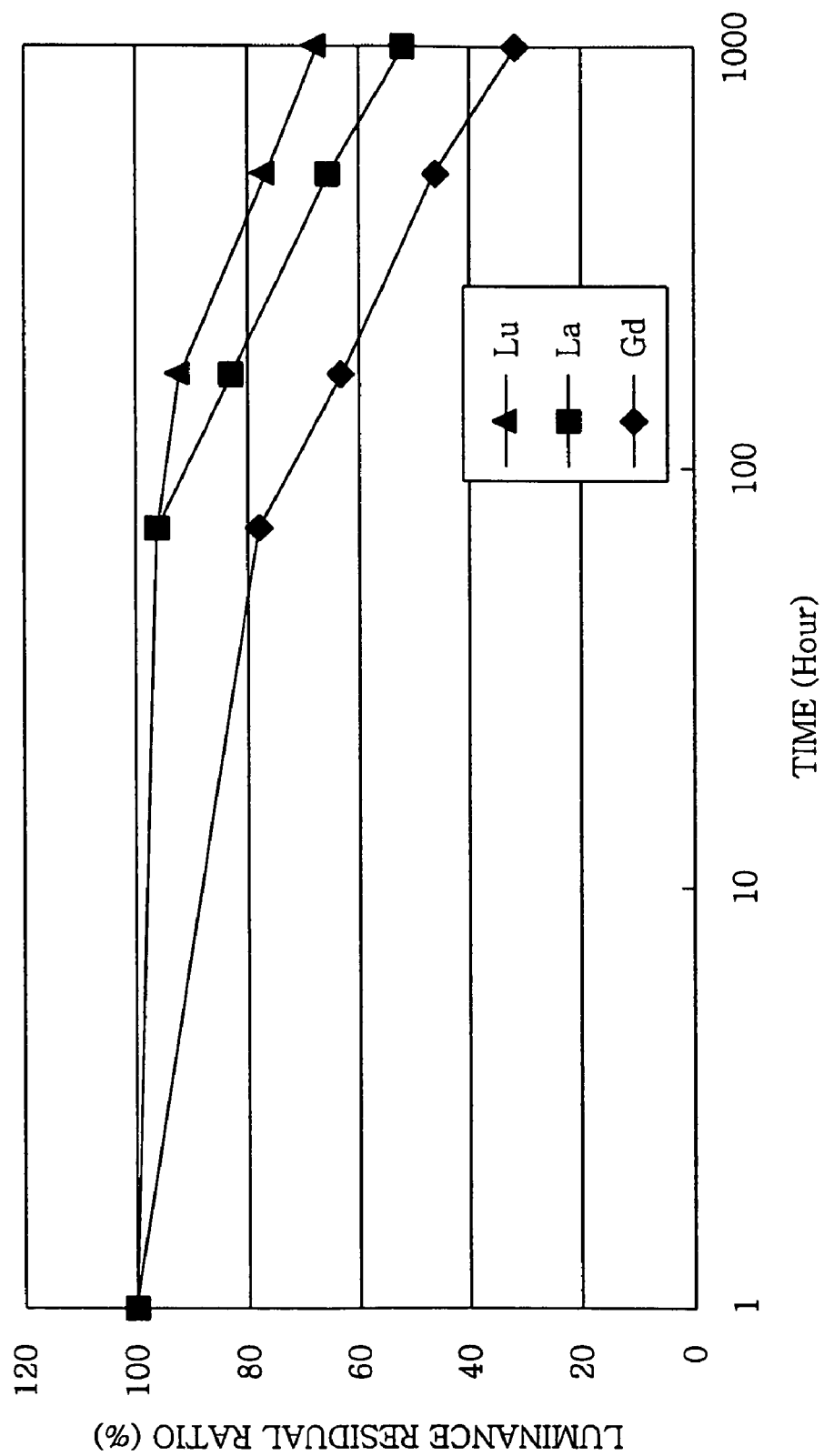
FIG. 8 is a graph illustrating the life spans of light emitting units each composed of a phosphor layer containing an $La_2O_2S$:Eu phosphor, a $Gd_2O_2S$:Eu phosphor and an $Lu_2O_2S$:Eu phosphor, respectively, in a multi-color luminous fluorescent display device, wherein the light emitting unit composed of a phosphorescent layer containing ZnO:Zn phosphor occupies 90% of the entire display area.

FIG. 8 is a graph illustrating the life spans of the light emitting units which are respectively composed of the phosphor layers having the $La_2O_2S$:Eu phosphor, the $Gd_2O_2S$:Eu phosphor and the $Lu_2O_2S$:Eu phosphor in the fluorescent display devices in which the light emitting unit composed of the phosphorescent layer having the ZnO:Zn phosphor occupies 90% of the entire display area.

According to FIG. 8, in case of the fluorescent display device using the $Lu_2O_2S$:Eu phosphor of which brightness, obtained after activating it continuously for 1000 hours, remains in the range of 68% of an initial brightness, and the brightness of the $La_2O_2S$:Eu phosphor remains in the range of 52% of an initial brightness, which can be used practically since the operation time thereof is generally short.

However, the fluorescent display device using the $Gd_2O_2S$:Eu phosphor of which brightness is markedly deteriorated, the brightness thereof, which was obtained after activating it continuously for 1000 hours, remains in the range of 32% of an initial brightness, which is impractical.

Furthermore, in case the light emitting unit composed of the phosphorescent layer having the ZnO:Zn phosphor occupies 90% of the entire display area, there can also be provided a multi-color fluorescent using a sulfide phosphor and/or other phosphors for use in the fluorescent display device as the phosphorescent layer of the remaining 10% in the multi-color fluorescent display device.

Example 5

A multi-color luminous fluorescent display device wherein 95% of the entire display area is occupied by a light emitting unit composed of a phosphorescent layer containing ZnO:Zn phosphor and the other display area is occupied by a light emitting unit composed of phosphor layers containing an $La_2O_2S$:Eu phosphor, a $Gd_2O_2S$:Eu phosphor or an $Lu_2O_2S$:Eu phosphor, respectively.

In order to examine the effect of a trace amount of moisture contained in the ZnO:Zn phosphor, which is considered as a material capable of occluding a trace amount of moisture, there were manufactured fluorescent display devices in which 95% of the entire display area is occupied by a light emitting unit composed of a phosphorescent layer containing ZnO:Zn phosphor and the other display area is occupied by another light emitting unit composed of a phosphorescent layer containing an $La_2O_2S$:Eu phosphor, a $Gd_2O_2S$:Eu phosphor or an $Lu_2O_2S$:Eu phosphor, respectively. Then, to examine the brightness deterioration thereof, the fluorescent display devices were activated continuously for 1000 hours while applying thereto an anode voltage of 60 V.

Figure 9:
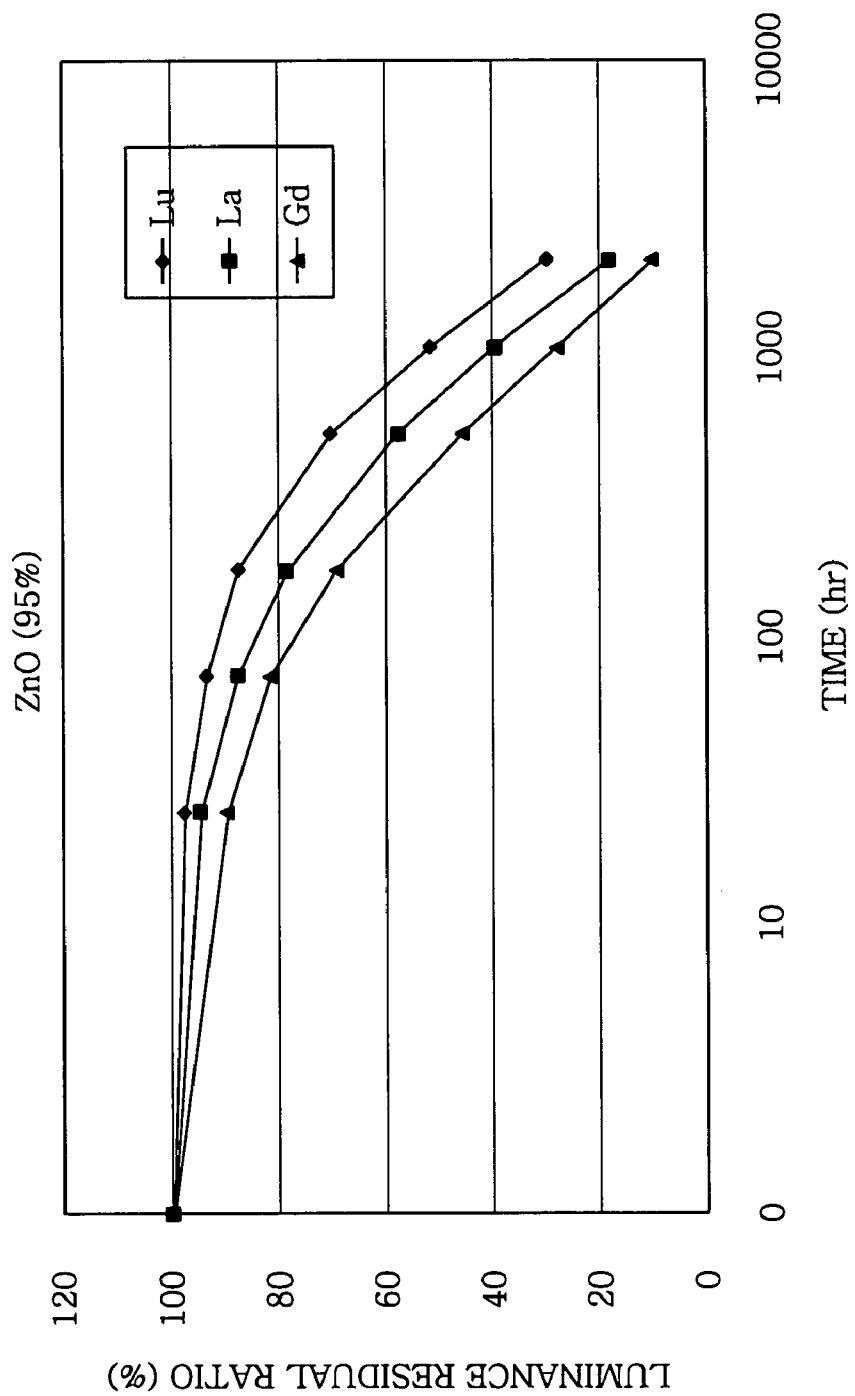
FIG. 9 is a graph illustrating the life spans of the light emitting units which are respectively composed of the phosphor layers having the $La_2O_2S$:Eu phosphor, the $Gd_2O_2S$:Eu phosphor and the $Lu_2O_2S$:Eu phosphor in the fluorescent display devices in which the light emitting unit composed of the phosphorescent layer having the ZnO:Zn phosphor occupies 95% of the entire display area.

FIG. 9 is a graph illustrating the life spans of the light emitting units which are respectively composed of the phosphor layers having the $La_2O_2S$:Eu phosphor, the $Gd_2O_2S$:Eu phosphor and the $Lu_2O_2S$:Eu phosphor in the fluorescent display devices in which the light emitting unit composed of the phosphorescent layer having the ZnO:Zn phosphor occupies 95% of the entire display area.

According to FIG. 9, in case of the fluorescent display device using the $Gd_2O_2S$:Eu phosphor of which brightness is markedly deteriorated, the brightness thereof, which was obtained after activating it continuously for 1000 hours, remains in the range of 28% of an initial brightness, and the fluorescent display device using the $La_2O_2S$:Eu phosphor maintains 38% of the initial brightness, which are impractical.

On the other hand, the fluorescent display device using the $Lu_2O_2S$:Eu phosphor maintains 50% of the initial brightness, which is satisfactory for practical purposes.

Furthermore, in case the light emitting unit composed of the phosphorescent layer having the ZnO:Zn phosphor occupies 95% of the entire display area, there can also be provided a multi-color fluorescent using a sulfide phosphor and/or other phosphors for use in the fluorescent display device as the phosphorescent layer of the remaining 5% in the multi-color fluorescent display device.

The following Table 1 shows the result of an ESCA analysis of surfaces of the $La_2O_2S$:Eu phosphor, the $Gd_2O_2S$:Eu phosphor and the $Lu_2O_2S$:Eu phosphor, respectively, of a fluorescent display device that has been manufactured completely but not yet activated; and also the result of an ESCA analysis of sulfate group on the surface of the $Lu_2O_2S$:Eu phosphor of the fluorescent display device which was continuously activated for 1000 hours. (The values in the table are relative ones.)

TABLE 1

| phosphor | ESCA analysis | | | |
| --- | --- | --- | --- | --- |
| | ZnO:Zn occupancy ratio | 0 hr | 1000 hr | 1000 hr/0 hr |
| $La_2O_2S$:Eu | 0 | 0.40 | 0.67 | 1.68 |
| | 10 | 0.41 | 0.82 | 2.00 |
| | 40 | 0.41 | 1.20 | 2.93 |
| | 90 | 0.39 | 1.50 | 3.85 |
| $Gd_2O_2S$:Eu | 0 | 0.38 | 0.62 | 1.63 |
| | 10 | 0.37 | 0.78 | 2.11 |
| | 40 | 0.39 | 0.95 | 2.44 |
| | 90 | 0.36 | 1.26 | 3.50 |
| $Lu_2O_2S$:Eu | 0 | 0.35 | 0.45 | 1.29 |
| | 10 | 0.37 | 0.55 | 1.49 |
| | 40 | 0.34 | 0.62 | 1.82 |

TABLE 1-continued

| phosphor | ESCA analysis | | | |
| --- | --- | --- | --- | --- |
| | ZnO:Zn occupancy ratio | 0 hr | 1000 hr | 1000 hr/0 hr |
| | 90 | 0.38 | 0.68 | 1.79 |
| | 95 | 0.38 | 0.82 | 2.11 |

According to Table 1, the following conclusions can be reached.

(1) In case of the $Lu_2O_2S$:Eu phosphor, the level of sulfate group is small mostly compared to the $La_2O_2S$:Eu phosphor and the $Gd_2O_2S$:Eu phosphor in the initial state and after activating the fluorescent display device continuously for 1000 hours.

(2) After the fluorescent display device has been continuously activated for 1000 hours, the levels of sulfate group generated in each of the $La_2O_2S$:Eu phosphor, the $Gd_2O_2S$:Eu phosphor and the $Lu_2O_2S$:Eu phosphor increase compared to those of their initial states.

(3) As the occupancy ratio of the ZnO:Zn phosphor is increased, the levels of sulfate group generated in each of the $La_2O_2S$:Eu phosphor, the $Gd_2O_2S$:Eu phosphor and the $Lu_2O_2S$:Eu phosphor increase after activating the fluorescent display device continuously for 1000 hours.

On the other hand, in the Table 1 showing the ESCA analysis results, after 1000 hours activation, in case of 90% occupancy ration of ZnO:Zn phosphor, the level of sulfate group in the fluorescent display device using $La_2O_2S$:Eu phosphor, after activated continuously for 1000 hours, is 3.85 times the initial level thereof and the level of sulfate group in the fluorescent display device using $Gd_2O_2S$:Eu phosphor, after activated continuously for 1000 hours, is 3.50 times the initial level thereof. However, from Examples 1 to 4, the brightness deterioration of the fluorescent display device using $La_2O_2S$:Eu phosphor is less than that of the fluorescent display device using $Gd_2O_2S$:Eu phosphor.

After 1000 hours activation, in case of 95% occupancy ration of ZnO:Zn phosphor, the level of sulfate group in the fluorescent display device using $Lu_2O_2S$:Eu phosphor is 2.11 times the initial level thereof. Further, from Examples 1 to 4, the brightness deterioration of the fluorescent display device using $Lu_2O_2S$:Eu phosphor is less than that of the fluorescent display device using $Gd_2O_2S$:Eu phosphor.

This is because, as for $La_2O_2S$:Eu phosphor, La constituting $La_2O_2S$:Eu phosphor has at the surface thereof photoconductive effects and/or separate mode of light emitting phenomenon.

Example 6

A phosphorescent layer 6a, wherein the $La_2O_2S$:Eu as a red light emitting phosphor is formed on the top surface of a graphite electrode, is arranged such that it occupies 5% of the entire display area. Further, a phosphorescent layer 6b in which a greenish yellow light emitting phosphor ($Zn_{0.9}Cd_{0.1}$S:Au, Al phosphor (wherein $In_2O_3$ is mixed) is formed on the top surface of the graphite electrode is arranged such that it occupies 5% of the entire display unit. Furthermore, a phosphorescent layer 6c in which the ZnO:Zn phosphor, which considered as a material capable of occluding a trace amount of moisture, is formed on the top surface of the graphite electrode, occupies 90% of the entire display area. In this manner, an anode substrate is formed, thereby manufacturing a multi-color luminous fluorescent display device as in Example 4.

In order to examine the brightness deterioration of the multi-color luminous fluorescent display device, the fluorescent display device has been activated continuously for 1000 hours by applying thereto an anode voltage of 60 V. As a result, it is confirmed that a light emitting unit containing the $La_2O_2S$:Eu phosphor is impractical due to its brightness deterioration.

Example 9

A multi-color luminous fluorescent display device employing a solid solution phosphor $(Lu_{1-x}, Ln(1)_x)_2O_2S$:Eu (where, $0<x\leqq0.1$ and Ln(1) is at least one selected from a group consisting of La, Gd, Y)) instead of the $Lu_2O_2S$:Eu phosphor.

According to the Comparative Example and Examples 2 to 4, the multi-color luminous fluorescent display device using the $Lu_2O_2S$:Eu phosphor among the $La_2O_2S$:Eu phosphor, the $Gd_2O_2S$:Eu phosphor and the $Lu_2O_2S$:Eu phosphor is minimally affected by the ZnO:Zn phosphor. Therefore, there was manufactured a phosphor in which the $Lu_2O_2S$:Eu phosphor is primarily used and part of Ln is substituted by one, two or three elements among Gd, La and Y up to 10%.

More specifically, after 1.2 moles of sulfur and sodium carbonate were added per a mole of $(Lu, La, Gd, Y)_2O_3$, $Eu_2O_3$ was added thereto such that Eu to (Lu, La, Gd, Y) ratio becomes 4 atm %. The mixture was then charged in an alumina crucible which is then sealed with a lid. Next, the mixture was sintered for two hours at 1200° C., thereby forming a $(Lu, La, Gd, Y)_2O_2S$:Eu phosphor.

Figure 10:
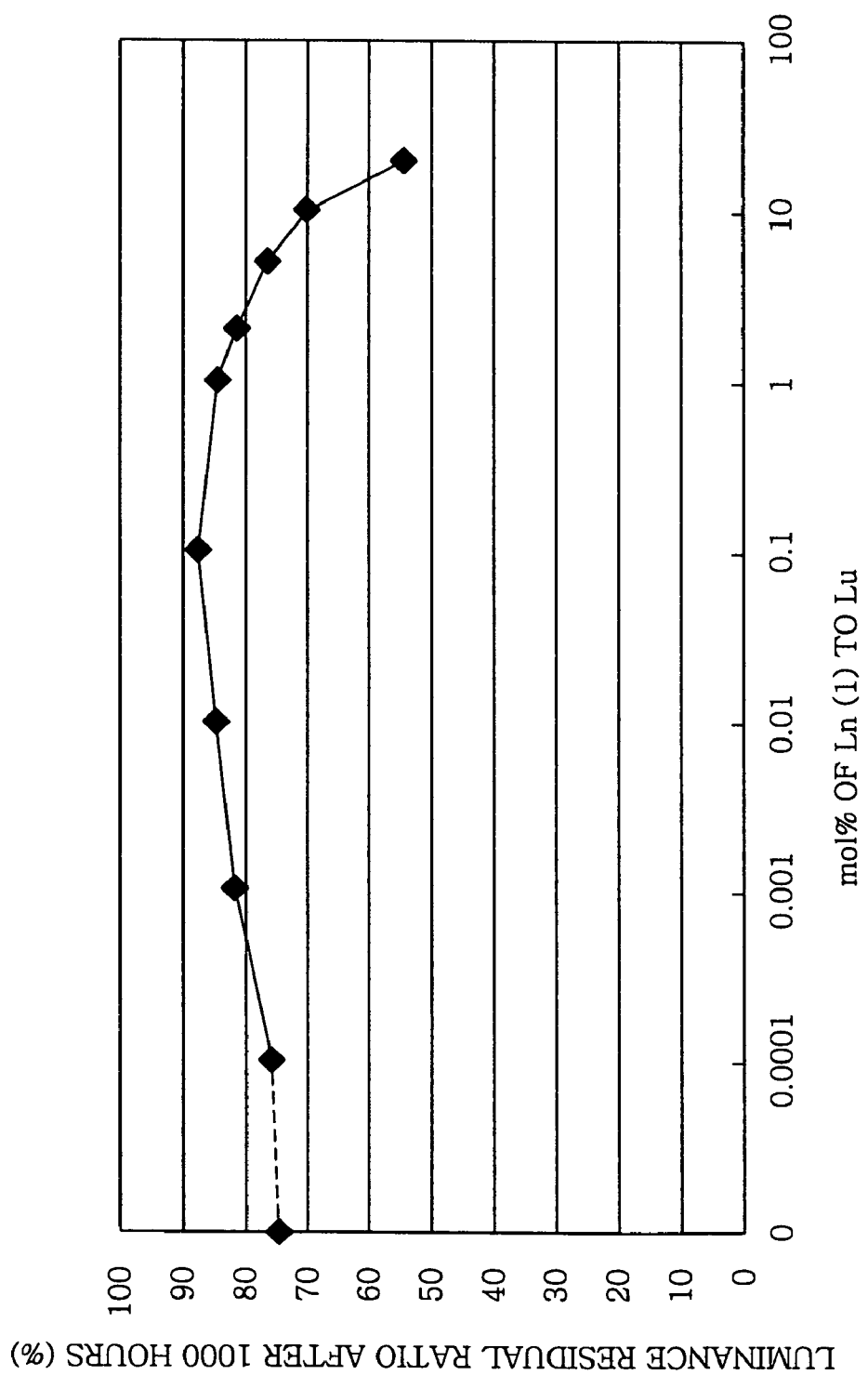
FIG. 10 is a graph illustrating an improvement of phosphor life span, which has been achieved when a mixed crystal is formed by mixing Lu at 10 mol % with at least one element selected from La, Gd and Y, compared to that of a conventional multi-color luminous fluorescent display device.

As depicted in a graph of FIG. 10, when a mixed crystal is formed by mixing Lu with at least one element selected from La, Gd and Y at 10 mol % or less, the overall life span is further improved compared to the conventional multi-color luminous fluorescent display device.

Further, by using a $(Lu, La, Gd)_2O_2S$:Eu phosphor or a $(Lu, La)_2O_2S$:Eu phosphor instead of the $(Lu, La, Gd, Y)_2O_2S$:Eu phosphor, there was manufactured a multi-color luminous fluorescent display device in which the ZnO:Zn, which is considered as a material capable of occluding a trace amount of moisture, occupies 90% of the entire display area as in Example 4. Thereafter, the multi-color luminous fluorescent display device was activated continuously for 1000 hours to thereby examine its life span. After the trial, it was observed that the fluorescent display device maintains 60% of the initial brightness.

In accordance with the present invention, there can provided a highly reliable multi-color luminous fluorescent display device using a yellow to red light emitting $Ln_2O_2S$:Eu phosphor capable of emitting light of high brightness by an anode voltage over 30 V.

While the invention has been shown and described with respect to the preferred embodiments, it will be understood by those skilled in the art that various changes and modification may be made without departing from the spirit and scope of the invention as defined in the following claims.

What is claimed is:

1. A multi-color luminous fluorescent display device including therein a vacuum-sealed vessel having a glass substrate, an anode disposed on the glass substrate, a cathode installed in the vacuum-sealed vessel, a first phosphorescent layer containing a phosphor emitting yellow to red light, and a second phosphorescent layer containing a phosphor emitting blue to green light, wherein the first phosphorescent layer contains a $Lu_2O_2S$: Eu phosphor which emits yellow to red light; and the second phosphorescent layer contains at least one phosphor selected from ZnO:Zn phosphor, $ZnGa_2O_4$ phosphor and $ZnGa_2O_4$:Mn phosphor which emit blue to green light, and wherein an area of the second phosphorescent layer containing at least one phosphor selected from ZnO:Zn phosphor, $ZnGa_2O_4$ phosphor and $ZnGa_2O_4$:Mn phosphor is 95% or less of an area of the total phosphorescent layers in the fluorescent display device.

2. The multi-color luminous fluorescent display device of claim 1, wherein an area of the second phosphorescent layer containing at least one phosphor selected from ZnO:Zn phosphor, $ZnGa_2O_4$ phosphor and $ZnGa_2O_4$:Mn phosphor is 10% or greater of an area of the total phosphorescent layers in the fluorescent display device.

3. A multi-color luminous fluorescent display device including therein a vacuum-sealed vessel having a glass substrate, an anode disposed on the glass substrate, a cathode installed in the vacuum-sealed vessel, a first phosphorescent layer containing a phosphor emitting yellow to red light, and a second phosphorescent layer containing a phosphor emitting blue to green light, wherein the first phosphorescent layer contains a $La_2O_2S$:Eu phosphor which emits yellow to red light; and the second phosphorescent layer contains at least one phosphor selected from ZnO:Zn phosphor, $ZnGa_2O_4$ phosphor and $ZnGa_2O_4$:Mn phosphor which emit blue to green light, and wherein an area of the second phosphorescent layer containing at least one phosphor selected from ZnO:Zn phosphor, $ZnGa_2O_4$ phosphor and $ZnGa_2O_4$.Mn phosphor is 90% or less of an area of the total phosphorescent layers in the fluorescent display device.

4. The multi-color luminous fluorescent display device of claim 3, wherein an area of the second phosphorescent layer containing at least one phosphor selected from ZnO:Zn phosphor, $ZnGa_2O_4$ phosphor and $ZnGa_2O_4$:Mn phosphor is 10% or greater of an area of the total phosphorescent layers in the fluorescent display device.

5. A multi-color luminous fluorescent display device including therein a vacuum-sealed vessel having a glass substrate, an anode disposed on the glass substrate, a cathode installed in the vacuum-sealed vessel, a first phosphorescent layer containing a phosphor emitting yellow to red light, and a second phosphorescent layer containing a phosphor emitting blue to green light, wherein the first phosphorescent layer contains a $Gd_2O_2S$:Eu phosphor which emits yellow to red light; and the second phosphorescent layer contains at least one phosphor selected from ZnO:Zn phosphor, $ZnGa_2O_4$ phosphor and $ZnGa_2O_4$:Mn phosphor which emit blue to green light, and wherein an area of the second phosphorescent layer containing at least one phosphor selected from ZnO:Zn phosphor, $ZnGa_2O_4$ phosphor and $ZnGa_2O_4$:Mn phosphor is 80% or less of an area of the total phosphorescent layers in the fluorescent display device.

6. The multi-color luminous fluorescent display device of claim 5, wherein an area of the second phosphorescent layer containing at least one phosphor selected from ZnO:Zn phosphor, $ZnGa_2O_4$ phosphor and $ZnGa_2O_4$:Mn phosphor is 10% or greater of an area of the total phosphorescent layers in the fluorescent display device.

7. A multi-color luminous fluorescent display device including therein a vacuum-sealed vessel having a glass substrate, an anode disposed on the glass substrate, a cathode installed in the vacuum-sealed vessel, a first phosphorescent layer containing a phosphor emitting yellow to red light, and a second phosphorescent layer containing a phosphor emitting blue to green light, wherein the first phosphorescent layer contains a $Gd_2O_2S$:Eu phosphor which emits yellow to red light; and the second phosphorescent layer contains at least one phosphor selected from ZnO:Zn phosphor. $ZnGa_2O_4$ phosphor and $ZnGa_2O_4$:Mn phosphor which emit blue to green light, and wherein the phosphor emitting yellow to red light is formed of a $(Lu, La, Gd, Y)_2O_2S$:Eu phosphor and an area of the second phosphorescent layer containing at least one phosphor selected from ZnO:Zn phosphor, $ZnGa_2O_4$ phosphor and $ZnGa_2O_4$:Mn phosphor is 10% or greater of an area of the total phosphorescent layers in the fluorescent display device.

8. A multi-color luminous fluorescent display device including therein a vacuum-sealed vessel having a glass substrate, an anode disposed on the glass substrate, a cathode installed in the vacuum-sealed vessel, a first phosphorescent layer containing a phosphor emitting yellow to red light, and a second phosphorescent layer containing a phosphor emitting blue to green light, wherein the first phosphorescent layer contains a $Ln_2O_2S$:Eu phosphor (Ln is at least one selected from a group consisting of La, Gd, Lu and Y) which emits yellow to red light; and the second phosphorescent layer contains at least one phosphor selected from ZnO:Zn phosphor, $ZnGa_2O_4$ phosphor and $ZnGa_2O_4$:Mn phosphor which emit blue to green light, and wherein the phosphor emitting yellow to red light is formed of a $(Lu, La, Gd)_2O_2S$:Eu phosphor and an area of the second phosphorescent layer containing at least one phosphor selected from ZnO:Zn phosphor, $ZnGa_2O_4$ phosphor and $ZnGa_2O_4$:Mn phosphor is 90% or less of an area of the total phosphorescent layers in the fluorescent display device.

9. The multi-color luminous fluorescent display device of claim 8, wherein an area of the second phosphorescent layer containing at least one phosphor selected from ZnO:Zn phosphor, $ZnGa_2O_4$ phosphor and $ZnGa_2O_4$:Mn phosphor is 10% or greater of an area of the total phosphorescent layers in the fluorescent display device.

10. A multi-color luminous fluorescent display device including therein a vacuum-sealed vessel having a glass substrate, an anode disposed on the glass substrate, a cathode installed in the vacuum-sealed vessel, a first phosphorescent layer containing a phosphor emitting yellow to red light, and a second phosphorescent layer containing a phosphor emitting blue to green light, wherein the first phosphorescent layer contains a $Ln_2O_2S$:Eu phosphor (Ln is at least one selected from a group consisting of La. Gd. Lu and Y) which emits yellow to red light; and the second phosphorescent layer contains at least one phosphor selected from ZnO:Zn phosphor, $ZnGa_2O_4$ phosphor and $ZnGa_2O_4$:Mn phosphor which emit blue to green light, and wherein the phosphor emitting yellow to red light is formed of a $(Lu, La)_2O_2S$:Eu phosphor and an area of the second phosphorescent layer containing at least one phosphor selected from ZnO:Zn phosphor, $ZnGa_2O_4$ phosphor and $ZnGa_2O_4$:Mn phosphor is 90% or less of an area of the total phosphorescent layers in the fluorescent display device.

11. The multi-color luminous fluorescent display device of claim 10, wherein an area of the second phosphorescent layer containing at least one phosphor selected from ZnO:Zn phosphor, $ZnGa_2O_4$ phosphor and $ZnGa_2O_4$:Mn phosphor is 10% or greater of an area of the total phosphorescent layers in the fluorescent display device.

12. A multi-color luminous fluorescent display device including therein a vacuum-sealed vessel having a glass substrate, an anode disposed on the glass substrate, a cathode installed in the vacuum-sealed vessel, a first phosphorescent layer containing a phosphor emitting yellow to red light, and a second phosphorescent layer containing a phosphor emitting blue to green light, wherein the first phosphorescent layer contains a $Ln_2O_2S$:Eu phosphor (Ln is at least one selected from a group consisting of La, Gd, Lu and Y) which emits yellow to red light; and the second phosphorescent layer contains at least one phosphor selected from ZnO:Zn phosphor, $ZnGa_2O_4$ phosphor and $ZnGa_2O_4$:Mn phosphor which emit blue to green light, and wherein an area of the second phosphorescent layer containing at least one phosphor selected from ZnO:Zn phosphor, $ZnGa_2O_4$ phosphor and $ZnGa_2O_4$:Mn phosphor is 10% or greater of an area of the total phosphorescent layers in the fluorescent display device.

* * * * *